US007669073B2

(12) United States Patent  
Graham et al.

(10) Patent No.: US 7,669,073 B2  
(45) Date of Patent: Feb. 23, 2010

(54) SYSTEMS AND METHODS FOR SPLIT MODE OPERATION OF FAULT-TOLERANT COMPUTER SYSTEMS

(75) Inventors: Simon Graham, Bolton, MA (US); Laurent Fournie, Belmont, MA (US); Jeffrey Somers, Northboro, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 505 days.

(21) Appl. No.: 11/207,289

(22) Filed: Aug. 19, 2005

(65) Prior Publication Data

US 2007/0043972 A1 Feb. 22, 2007

(51) Int. Cl.  
*G06F 11/00* (2006.01)
(52) U.S. Cl. .......................................... 714/1
(58) Field of Classification Search .................. 714/12, 714/1  
See application file for complete search history.

(56) References Cited

U.S. PATENT DOCUMENTS

| | | | | |
|---|---|---|---|---|
| 4,503,534 | A | * | 3/1985 | Budde et al. ................... 714/54 |
| 5,255,367 | A | * | 10/1993 | Bruckert et al. ............... 714/11 |
| 5,615,403 | A | * | 3/1997 | Bissett et al. .................. 710/61 |
| 5,696,895 | A | | 12/1997 | Hemphill et al. |
| 5,790,397 | A | * | 8/1998 | Bissett et al. ................... 700/2 |
| 5,991,900 | A | | 11/1999 | Garnett |
| 6,085,333 | A | * | 7/2000 | DeKoning et al. ............. 714/7 |
| 6,138,198 | A | | 10/2000 | Garnett et al. |
| 6,141,718 | A | | 10/2000 | Garnett et al. |
| 6,148,348 | A | | 11/2000 | Garnett et al. |
| 6,167,477 | A | | 12/2000 | Garnett et al. |
| 6,173,351 | B1 | | 1/2001 | Garnett et al. |
| 6,223,230 | B1 | | 4/2001 | Garnett et al. |
| 6,260,159 | B1 | | 7/2001 | Garnett et al. |
| 6,262,493 | B1 | | 7/2001 | Garnett |
| 6,542,962 | B2 | | 4/2003 | Kodama et al. |
| 6,587,961 | B1 | * | 7/2003 | Garnett et al. ................ 714/11 |
| 6,618,805 | B1 | | 9/2003 | Kampe et al. |
| 6,640,203 | B2 | | 10/2003 | Brown et al. |
| 6,694,406 | B2 | | 2/2004 | Kodama et al. |
| 6,718,472 | B1 | | 4/2004 | Garnett |
| 6,732,250 | B2 | | 5/2004 | Durrant |
| 6,785,763 | B2 | | 8/2004 | Garnett et al. |
| 6,785,777 | B2 | | 8/2004 | Garnett et al. |
| 6,785,840 | B1 | | 8/2004 | Smith et al. |
| 6,823,474 | B2 | | 11/2004 | Kampe et al. |

(Continued)

FOREIGN PATENT DOCUMENTS

EP 0 757 315 A2 2/1997

OTHER PUBLICATIONS

Motorola, Inc. FX Series "Split Mode for AIX Overview and User's Guide", 1998 USA.

*Primary Examiner*—Scott T Baderman  
*Assistant Examiner*—Yair Leibovich  
(74) *Attorney, Agent, or Firm*—K&L Gates LLP

(57) ABSTRACT

Methods and systems are provided by which a computer system, and in particular, a lockstep fault-tolerant computer system, may be split into a plurality of independently operational subsystems. Each subsystem may be examined, managed or upgraded by an administrator while the overall computer system continues to service end-users. Finally, the separate subsystems may be merged in an efficient fashion and fault-tolerant operation will resume upon the combined system.

37 Claims, 4 Drawing Sheets

U.S. PATENT DOCUMENTS

| | | |
|---|---|---|
| 6,854,069 B2 | 2/2005 | Kampe et al. |
| 6,862,645 B2 | 3/2005 | Garnett |
| 6,873,914 B2 | 3/2005 | Winfield et al. |
| 6,877,108 B2 | 4/2005 | Kane et al. |
| 2001/0056461 A1 | 12/2001 | Kampe et al. |
| 2002/0007468 A1 | 1/2002 | Kampe et al. |
| 2002/0032883 A1 | 3/2002 | Kampe et al. |
| 2002/0042693 A1 | 4/2002 | Kampe et al. |
| 2002/0116151 A1 | 8/2002 | Brown et al. |
| 2002/0144175 A1* | 10/2002 | Long et al. .................... 714/11 |
| 2003/0105988 A1* | 6/2003 | Shanbhogue ................... 714/7 |
| 2003/0182492 A1 | 9/2003 | Watkins et al. |
| 2004/0019771 A1* | 1/2004 | Quach ........................ 712/229 |
| 2004/0208130 A1 | 10/2004 | Mizutani et al. |
| 2005/0108720 A1* | 5/2005 | Cervini ....................... 718/105 |

* cited by examiner

SYSTEMS AND METHODS FOR SPLIT MODE OPERATION OF FAULT-TOLERANT COMPUTER SYSTEMS

FIELD OF THE INVENTION

The present invention relates to fault-tolerant computer systems, and specifically to improved methods for splitting, managing and upgrading redundant fault-tolerant computer systems.

BACKGROUND OF THE INVENTION

Computers are used to operate critical applications for millions of people every day. These critical applications may include, for example, maintaining a fair and accurate trading environment for financial markets, monitoring and controlling air traffic, operating military systems, regulating power generation facilities and assuring the proper functioning of life-saving medical devices and machines. Because of the mission-critical nature of applications of this type, it is crucial that their host computers remain operational virtually all of the time.

Despite attempts to minimize failures in these applications, the computer systems still occasionally fail. Hardware or software glitches can retard or completely halt a computer system. When such events occur on typical home or small-office computers, there are rarely life-threatening ramifications. Such is not the case with mission-critical computer systems. Lives can depend upon the constant availability of these systems, and therefore there is very little tolerance for failure.

In an attempt to address this challenge, mission-critical systems often employ redundant hardware or software to guard against catastrophic failures and provide some tolerance for unexpected faults within a computer system. As an example, when one computer fails, another computer, often identical in form and function to the first, is brought on-line to handle the mission critical application while the first is replaced or repaired. Many fault-tolerant systems provide redundant computer subsystems which operate in lockstep, with each executing identical instructions at the same time.

Exemplary fault-tolerant systems are provided by Stratus Technologies International of Maynard, Mass. In particular, Stratus' ftServers provide better than 99.999% availability, being offline only two minutes per year of continuous operation, through the use of parallel hardware and software typically running in lockstep. During lockstep operation, the processing and data management activities are synchronized on multiple computer subsystems within an ftServer. Instructions that run on the processor of one computer subsystem generally execute in parallel on another processor in a second computer subsystem, with neither processor moving to the next instruction until the current instruction has been completed on both. Redundant, fault-tolerant computer systems which employ two subsystems operating in lockstep are referred to as Dual Modular Redundant (DMR), and provide means by which each subsystem may check the operations of the other subsystem. Similarly, fault-tolerant computer systems which employ three subsystems operating in lockstep are referred to as Tri Modular Redundant (TMR), and provide means by which a result is deemed correct if it is obtained independently by two of the three subsystems.

The processing subsystems are typically joined by a bridge, which in turn is linked to a bus. Various Input/Output (I/O) devices are then attached to the bus, and may include disk storage, network communications, graphical interfaces, and so forth. In the event of a failure, the failed subsystem may be brought offline while the remaining subsystem continues executing. The failed subsystem is then repaired or replaced, brought back online, and synchronized with the still-functioning processor. Thereafter, the two systems resume lockstep operation.

Existing systems have also occasionally allowed for an administrator controlled splitting of a DMR or TMR system into two or more simplex subsystems. In this mode of operation, or split mode, each subsystem typically operates independently, with access to its own network, keyboard, display, and other I/O components. While in split mode, these administrators often attempt to upgrade the software, and in particular the Operating System software on each side.

SUMMARY OF THE INVENTION

However, existing split mode computer systems typically were relatively difficult and slow to split, required rebooting of each independent subsystem, left the separated subsystems in different states and forced administrators to view and interact with each subsystem through separate keyboards, mice, displays and other I/O devices. Furthermore, these split mode systems were often offline for significant periods of time, thereby noticeably interrupting service to end-users. Finally, existing split mode systems left each partition in a separate state, such that no two subsystems were in identical operational states after a split.

Thus, a need exists for a computer system which may rapidly transition from redundant fault-tolerant operation to split mode operation without requiring a reboot of any subsystem. A need also exists for a split mode computer system which maintains processor state in each separate subsystem after a split takes place. Furthermore, a need exists for a split mode computer system which allows one subsystem to continue operating normally and providing service to end-users after the split. Finally, a need exists for a split mode computer system on which an active subsystem can be used to monitor, access or install software on another subsystem.

In satisfaction of these needs and others, embodiments of the present invention provide systems and methods for rapidly splitting redundant, fault-tolerant computers and accessing, monitoring and upgrading those computers during the split.

In accordance with one embodiment of the invention, a method is provided for splitting a lockstep computer system into at least two processing subsystems. This method includes the steps of designating an active subsystem and an upgrade subsystem from among the at least two processing subsystems; isolating components within the upgrade subsystem from the other subsystems; and, splitting the lockstep system such that, at the time of the split, the active subsystem and the upgrade subsystem have identical operational states, but thereafter operate independently.

In accordance with another embodiment of the invention, a computer system comprising at least two processing subsystems is provided. In this embodiment, the computer system is configured to: designate a first subsystem and an second subsystem from the two processing subsystems; isolate components within the second subsystem from the first subsystem; and, split the system such that, at the time of the split, the first subsystem and the second subsystem have identical operational states, but thereafter operate independently.

In accordance with a third embodiment, a dual-mode redundant, fault-tolerant computer system is provided. This computer system includes a first subsystem comprising a first processor, a first network connection, and a first local mass storage medium. The computer system also includes a second subsystem comprising a second processor, a second network connection, and a second local mass storage medium, the second subsystem connected to and in lockstep operation with the first subsystem. In this embodiment, the second subsystem may be split from the first subsystem and operated independently without rebooting or physically removing either subsystem.

In a fourth embodiment, a dual-mode redundant, fault-tolerant computer system is provided. This computer system includes: a first processor, a first network connection, and a first local mass storage medium; a second subsystem comprising a second processor, a second network connection, and a second local mass storage medium; and, specific circuitry dedicated to the split in communication with the first and second subsystems, capable of isolating the first subsystem from the second subsystem while preserving the state of the fault-tolerant computer system prior to the isolation.

In a fifth embodiment of the present invention, a fault-tolerant computer system is provided. This computer system includes a first subsystem comprising a first processor, a first network element, and a first persistent storage device. The computer system also includes a second subsystem comprising a second processor, a second network element, and a second persistent storage device, the second subsystem adapted to connect to and operate in lockstep operation with the first subsystem. As defined by this embodiment, the second subsystem may be split from the first subsystem and operated independently of the first subsystem without reboot or removal of either subsystem.

In the final embodiment, a fault-tolerant computer system is provided which includes: a first subsystem comprising a first processor, a first network element, and a first local mass storage device; a second subsystem comprising a second processor, a second network element, and a second local mass storage device; and, a very large scale integration circuit in electrical communication with the first and second subsystems, the VLSI circuit adapted to isolate the first subsystem from the second subsystem, preserve code execution for at least one of the processors prior to the isolation, and regulate lockstep operation of the two processors.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION OF THE PREFERRED EMBODIMENTS

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

In general, the claimed invention preferably uses redundant hardware in a fully-duplexed, lockstep, fault-tolerant computer system to simulate a rolling update of individual subsystems within the overall computer system. Stratus' proprietary hardware provides the means to split a computer system into two separate subsystems each having a single CPU and I/O component. As described previously, this is referred to as split mode operation. When in split mode, each subsystem sees the other subsystems as present but removed from service. When a DMR system is running in split mode, one half of the system will continue to actively run the applications (the primary subsystem) and the other will be accessed or updated as necessary (the secondary subsystem). In addition, the simplexed or legacy external devices (including, for example keyboard, video, mouse, COM ports, USB ports) preferably remain connected to the primary subsystem. The only access to the secondary subsystem will be via a specialized communications path through the Virtual Technician Module, or VTM.

Figure 1:
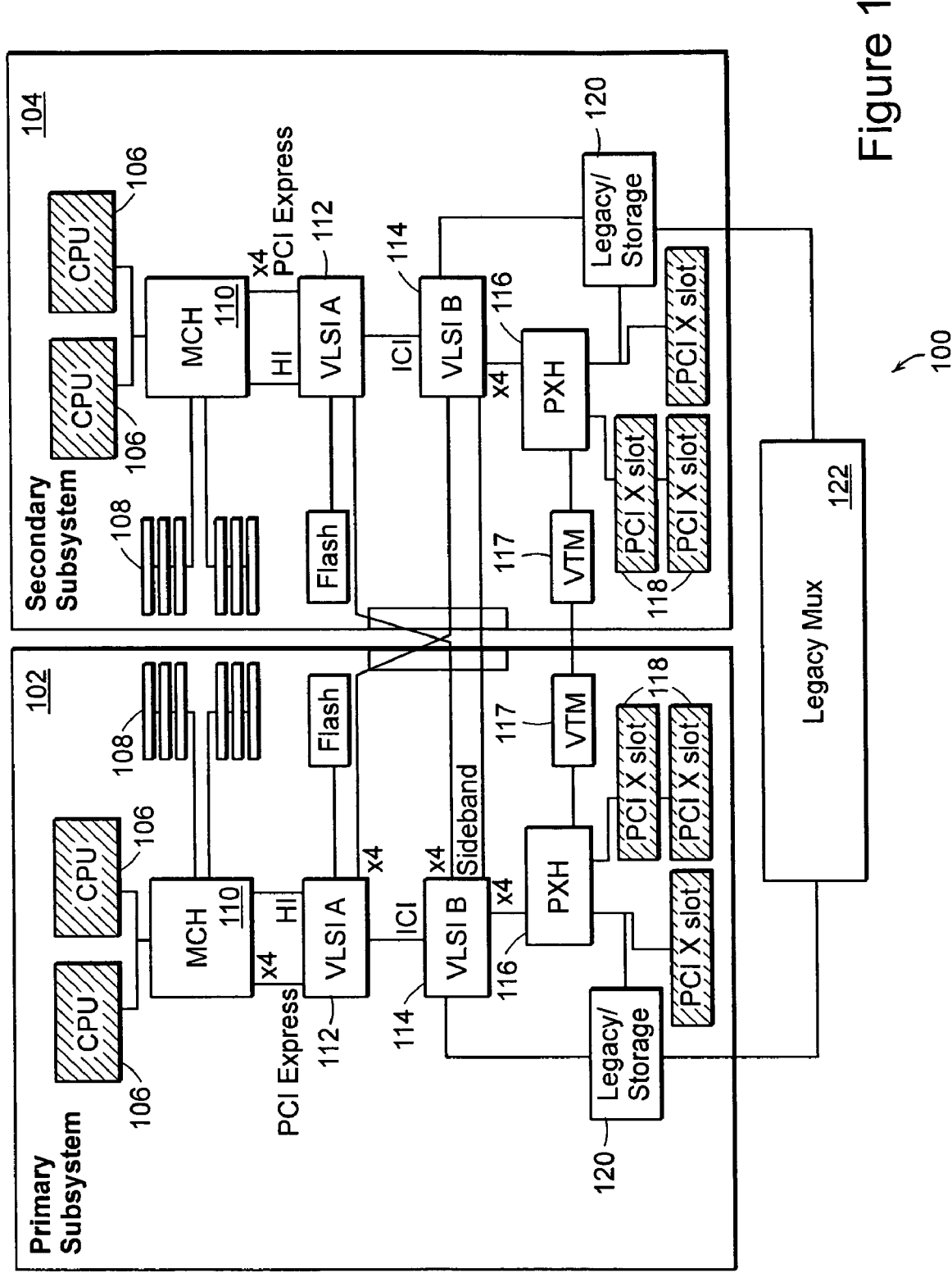
FIG. 1 is an architectural schematic illustrating a dual modular redundant fault-tolerant computer system according to an embodiment of the present invention.

FIG. 1 is an architectural schematic illustrating a dual modular redundant (DMR) fault-tolerant computer system 100 according to an embodiment of the present invention. This computer system 100 preferably includes a primary subsystem 102 and a secondary subsystem 104. Preferably, the primary subsystem 102 and secondary subsystem 104 are CPU/Memory units which may or may not be replaceable by an end-user. As illustrated, the primary subsystem 102 comprises one or more CPUs 106, memory 108, memory control hardware (MCH) 110, a first Very Large Scale Integration circuit (VLSI A) 112, a second Very Large Scale Integration circuit (VLSI B) 114, PCI-X control hardware (PXH) 116, a VTM 117, one or more PCI-X slots 118, and a Legacy/Storage I/O bus 120. As is evident from the illustration, the secondary subsystem 104 preferably includes identical components. Finally, the primary and secondary subsystems 102, 104 both interface with a legacy MUX 122.

Most of the hardware illustrated in FIG. 1 constitutes off-the shelf components which should be familiar to one skilled in the art. For example, each CPU 106 may comprise an Intel Pentium 4 processor, as produced by Intel Corporation of Santa Clara, Calif. The memory 108 may comprise Random Access Memory (RAM), Magneto-Resistive RAM (MRAM), or any sufficiently fast data storage device. The MCH 110, controls access to and from the memory 108. The PXH 116 manages communications with devices that interface with the PCI-X slots 118. The VTM 117 allows an administrator to access and administer the subsystems 102, 104 through a separate network connection. In addition, the VTM 117 of the primary subsystem 102 may be in communication with the VTM 117 of the secondary subsystem 104, and optionally with external devices, during both normal and split mode operation. And, the Legacy/Storage I/O 120 facilitates communication between primary subsystem 102 and external devices such as a keyboard, a display, a mouse, or any other I/O device through the use of the MUX 122.

VLSI A 112 is responsible for CPU 106 error checking and for routing traffic between the CPUs 106 and the I/O bus 120. In the preferred embodiment, both VLSI A and VLSI B comprise Field Programmable Gate Arrays. However, in alternate embodiments, they may comprise Application Specific Integrated Circuits. Furthermore, VLSI A and VLSI B may be combined in a single device in other embodiments as well.

VLSI B 114 preferably contains registers which, when set and triggered by a software command or interrupt, toggle the operation of the computer system 100 from DMR fault-tolerant operation to split mode operation. Preferably, these registers include sufficient storage for a split-go bit, or set of bits (not shown), and a split-I/O bit, or set of bits (also not shown).

The split-I/O bit, when set, indicates that a subsystem has been designated as a secondary subsystem 104. As a secondary subsystem 104, it will lose connection through its I/O 120 to legacy devices upon entering split mode. In essence, the secondary subsystem 104 will act as if it has been physically separated from the primary subsystem 102, peripheral devices, and other legacy systems.

The split-go bit, when set, instantly severs the communications links which allow the primary subsystem 102 and secondary subsystem 104 to provide fault-tolerant operation. Preferably, the split-go bit is set upon a software command or interrupt. At this point, any subsystem designated as secondary through the use of the split-I/O bit will be severed from the other subsystems. However, any subsystem not designated as secondary will continue operating normally, but will be unable to communicate with each secondary subsystem 104. Thus, in a Tri Module Redundant (TMR) computer system, it is possible that two subsystems will be designated as primary, and one as secondary, with the two primary subsystems 102 still able to maintain fault-tolerant operation in a DMR fashion.

Figure 2:
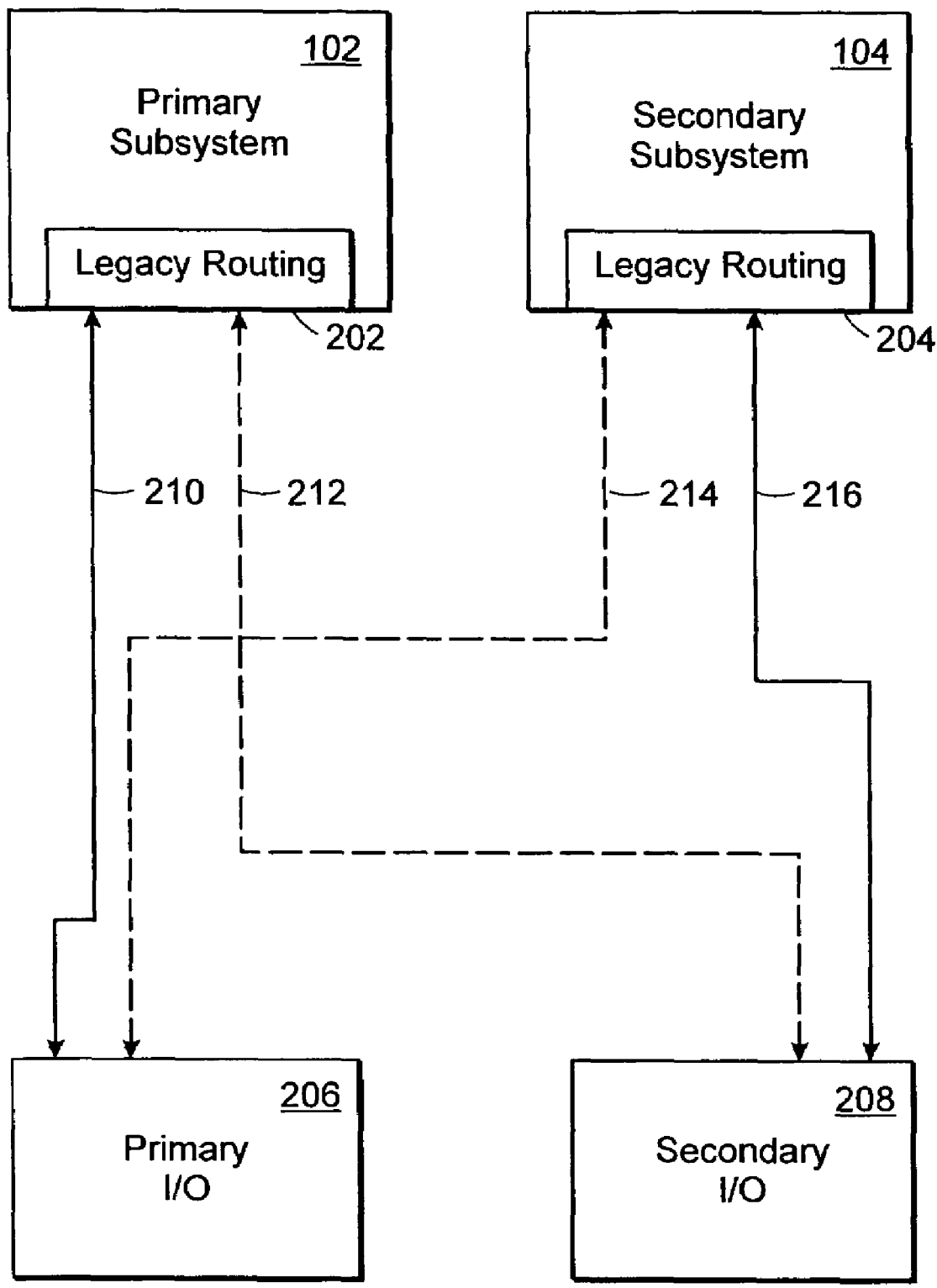
FIG. 2 is a block diagram depicting the I/O interface between primary and secondary subsystems within the fault-tolerant computer system.

FIG. 2 is a block diagram depicting the I/O interface between primary and secondary subsystems within the fault-tolerant computer system. As illustrated, the primary subsystem 102 contains legacy routing hardware 202. Similarly, the secondary subsystem 104 contains its own legacy routing hardware 204. Also illustrated are a primary I/O 206 and a secondary I/O 208.

The legacy routing hardware 202, 204 allows each subsystem 102, 104 to interact with the I/O from any other subsystem during normal fault-tolerant operation. Thus, the legacy routing hardware 202 of the primary subsystem 102 preferably interfaces with the primary I/O 206 through path 210 and with the secondary I/O 208 through path 212. The routing hardware 204 of the secondary subsystem 104 also preferably interfaces with the primary I/O 206 through path 214 and with the secondary I/O 208 through path 216. Each path 210-216 is merely representative of a physical communications medium, and may comprise a bus, backplane, or any other method of electrical communication.

In operation, all paths 210-216 are initially active, and the computer system 100 is fully duplexed. In preparation for a split, the computer system 100 is configured such that only the primary subsystem 102 will have access to legacy I/O communications after the split. These legacy I/O communications include those necessary for most I/O devices including, for example, a CD-Rom, DVD player, USB, keyboard, monitor, etc. Preferably, this interaction is initiated through the use of the split-I/O bit.

At the time of the split, the split-go bit is preferably set by the software, and the primary subsystem 102 and secondary subsystem 104 are separated into two simplex systems. At this stage, the I/O paths 212, 214 between the subsystems 102, 104 and each-other's I/Os 206, 208 are effectively severed. Thus, the primary subsystem 102 can no longer communicate with the secondary I/O 208. Similarly, the Secondary subsystem 104 can no longer communicate with the primary I/O 206. Each subsystem may continue to communicate with its own local hardware (including, for example, local mass storage, RAM, etc.). However, only the primary subsystem 102 will be able to access the legacy devices.

When it is time to merge the primary and secondary subsystems 102, 104, the primary subsystem 102 is re-initialized. Thereafter, the split-I/O bits are cleared from the secondary subsystem 104. Accordingly, when the primary subsystem completes its re-initialization, all paths 210-216 are fully functional and the system 100 can operate in fault-tolerant mode.

Figure 3:
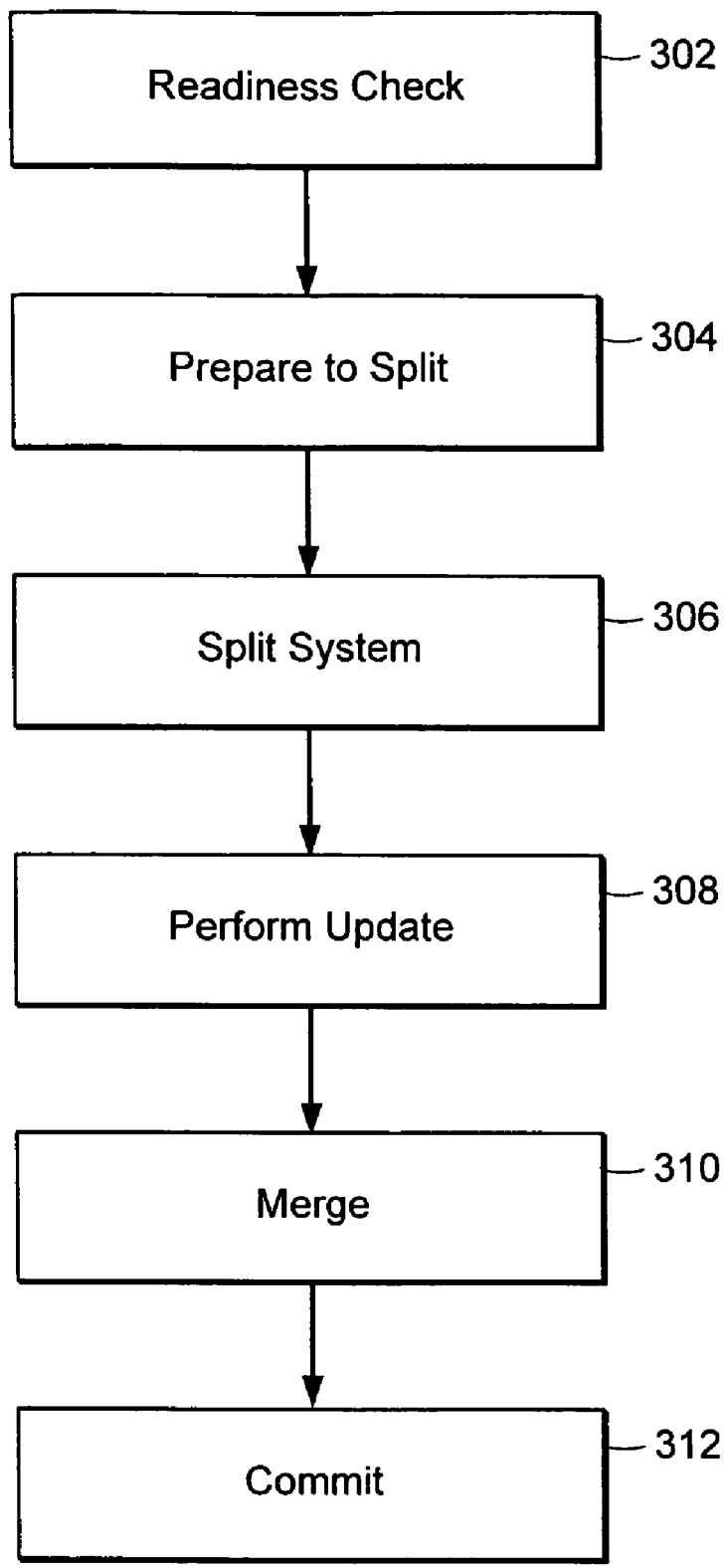
FIG. 3 is a high-level flow chart illustrating exemplary steps involved in splitting, updating and merging a fault-tolerant computer system.

FIG. 3 is a high-level flow chart illustrating exemplary steps involved in splitting, updating and merging a fault-tolerant computer system. This process includes the following steps: completing a readiness check 302, preparing to split 304, splitting the system 306, performing the necessary update 308, merging the system 310 and committing the updates 312.

The first step in this process is performing a readiness check 302. Preferably, before starting a split/upgrade/merge procedure, the state of the computer system 100 state is checked to ensure that such a procedure can be performed. The readiness check 302 preferably consists of ensuring that all critical resources in the computer system 100 are in a fully duplexed and safe-to-pull state. The system is deemed safe-to-pull if any subsystem 102, 104 could be removed or hot-swapped without halting operation of the overall computer system 100. In essence, the readiness check 302 is a snapshot check and preferably would not change the state of the system 100.

Next, the computer system 100 is prepared for the split 304. During this step, the system state may be checked again to ensure that an upgrade can be performed and the various system components are informed that an split operation will occur in short order. At this stage, the running state of the system 100 is modified to account for the split processing and recovery from error will require extra work. In particular, the split-I/O bits are set. In addition, the network and storage interfaces, or I/Os 120, of the secondary subsystem 104 are preferably disabled.

The computer system 100 is then split 306 into the primary subsystem 102 and the secondary subsystem 104. In the preferred embodiment, this involves physically splitting the hardware in such a way that the secondary subsystem has no network access and can not access any external storage devices. This is effectuated almost instantaneously, and occurs upon the setting of the split-go bit within each subsystem. At this time, copies of any applications then running on the secondary subsystem 104 are terminated, and the application data volumes are dismounted. This application data will be discarded with the subsystems 102, 104 are once again merged, to avoid using any application data that has become stale or out of date.

In an embodiment where an administrator will be updating the system 100, the next step is to actually perform the update 308 on the secondary subsystem 104. During this time, the primary subsystem continues to actively run applications and provide service. Preferably, the secondary subsystem 104 only has access to its local storage during this stage. The required upgrade is performed, including any necessary reboots. For example, the Operating System (OS) might be upgraded or additional software may be installed on the secondary subsystem 104. At the end of this phase, the secondary subsystem 104 is executing the updated system software and is ready to resume control of the system 100. In addition, the OS or newly installed software may be tested, and the secondary subsystem 104 may be rebooted or reinitialized multiple times to ensure that it is operating properly.

After the update is complete or the need for splitting the system 100 has passed, the primary subsystem 102 and secondary subsystem 104 are once again merged 310. The preparations for this merger preferably involve halting any applications then running on the primary subsystem 102 and flushing any pending application data updates to disk. Thereafter, the split-go bit is reset, the hardware is merged, the application data is propagated to the secondary subsystem 104 and the primary subsystem 102 is reinitialized. In this fashion, the secondary subsystem may resume operation of any previously running applications at the same point that operation was halted by the primary subsystem 102. Furthermore, by resetting the split-go bit, each subsystem has full access to all I/O devices, and the secondary subsystem 104 regains access to the network and external devices. At this point, the system 100 resumes execution in hardware fault-tolerant mode and has access to all its resources. The applications are fully operational and can be fully tested.

Once the administrator is satisfied with the merged and updated system, the update is committed 312 by destroying old OS or application data. At this time, the previously designated primary subsystem 102 synchronizes its disks with the upgraded (previously secondary 104) subsystem. With the above exemplary process thus described, we will now describe the detailed software implementation which facilitates such a process.

Preferably, the software services provided upon the computer system 100 are logically divided into two main algorithmic categories: publishers and subscribers. In the present embodiment, a well-known singleton object publisher is used to provide methods to subscribe/unsubscribe for incoming requests sent by a User Interface (UI) which is used by an administrator in accessing the computer system 100.

In the preferred embodiment, a publisher object listens for and accepts incoming configuration or control requests on the system 100, forwards them to subscribers, aggregates results and returns control flow to the UI when all subscribers have finished. When the system 100 is running in split mode, a publisher executes on each subsystem 102, 104. The publisher running on the primary subsystem is connected with the UI and is deemed the master publisher. The publisher running on the secondary subsystem 104 is deemed the slave publisher. The slave publisher is a hybrid object that behaves like a subscriber from the master publisher's standpoint and like a publisher from the slave subscribers' standpoints.

In the preferred embodiment, subscribers execute the appropriate sequence of operations to enable, disable, split or merge the devices and resources they manage. Subscribers also store their current state persistently. Subscribers report their progress to the publisher and eventually return the control flow along with a success or failure status code. When all subscribers, and the slave publisher if any, have finished their tasks, the master publisher returns the control flow to the UI along with the aggregation of success or failure statuses returned by individual subscribers.

Preferred examples of subscribers used in conjunction with the claimed invention include:
   A common code subscriber that manages each CPU board, I/O board, BMC device, USB device, legacy devices (CD/DVD), etc.
   A disk subscriber that manages hard disks which may be rapidly resynchronized.
   A network subscriber.
   A VTM subscriber.
   A PCI subscriber governing any PCI functions that are not managed by the disk, network or VTM subscribers.
   An application subscriber which maintains a list of applications that must be halted on the primary subsystem 102 during split mode and restarted on the secondary subsystem 104 after the subsystems are merged.

Figure 4:
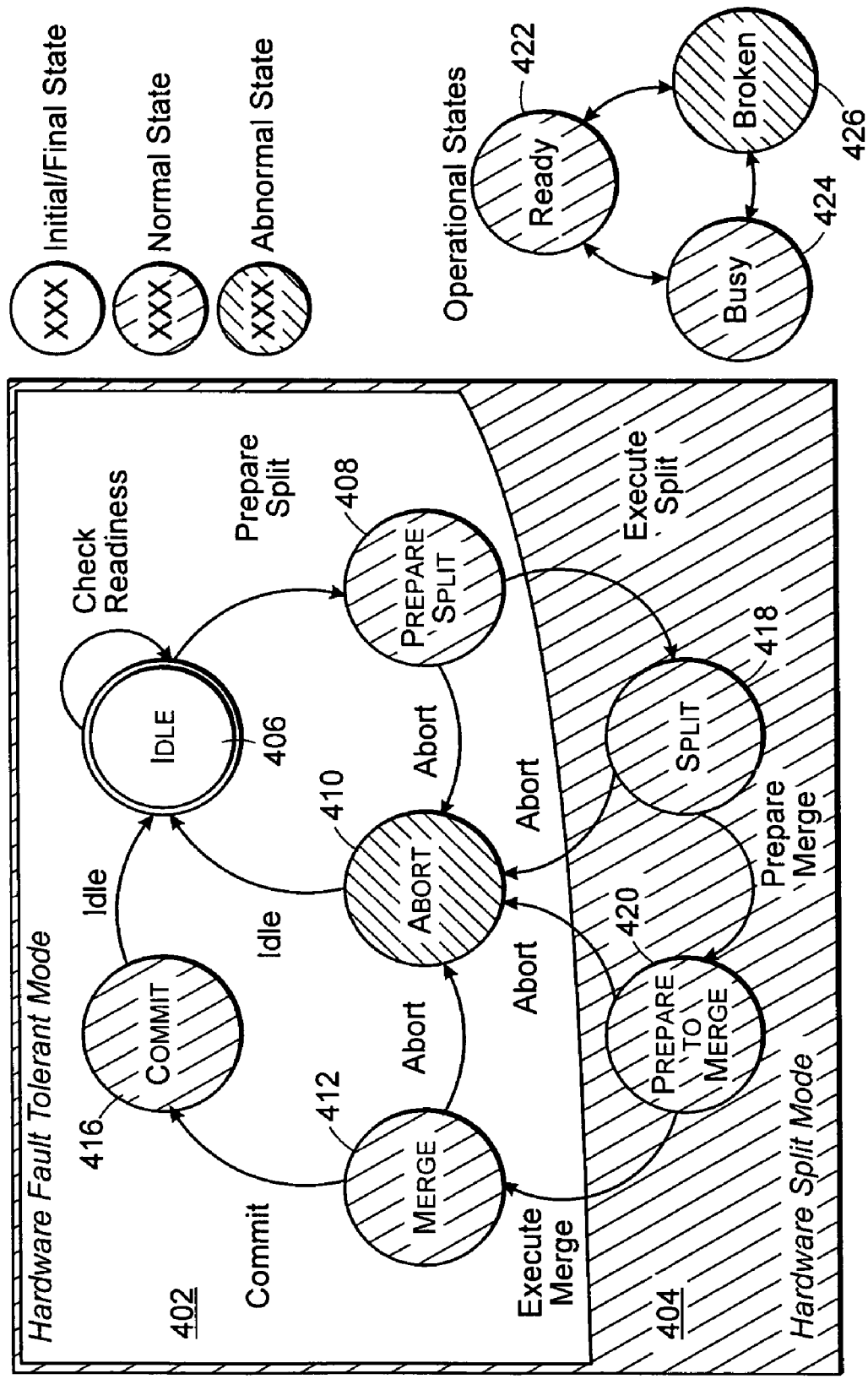
FIG. 4 is a detailed state diagram illustrating the fault-tolerant computer system's various operational states.

FIG. 4 is a detailed state diagram 400 illustrating the fault-tolerant computer system's various operational states. These operational states relate to the various publishers and subscribers described previously, and reflect the status of the computer system 100 and each subsystem 102, 104 at various points in time.

As illustrated by FIG. 4, the preferred embodiment employs a variety of states during both normal and split mode operation. Normal operation, or hardware fault-tolerant mode 402, preferably includes the states present in the upper portion of the state diagram 400. These states include: Idle 406, Prepare Split 408, Abort 410, Merge 412 and Commit 416. Split mode operation 404 preferably includes the steps present in the lower region of the state diagram 400. These states include Split 418 and Prepare to Merge 420.

The transitions between these states are facilitated by high-level control requests which include, for example: Check Readiness, Prepare Split, Execute Split, Prepare Merge, Execute Merge, Commit, Abort, and Idle. Each control request preferably corresponds to a single method invocation sent from the UI to a service's publisher and eventually forwarded by the publisher to subscriber objects as appropriate.

At any given point in time, the publishers and subscribers are in one of the states shown in the state change diagram 400. In addition, each state shown has one of three operational sub-states. These sub-states include busy 424, broken 426 and ready 422 states. Busy 424 means an activity is being processed. Broken 426 means the activity failed to complete. Ready 422 means the activity has completed successfully.

The meanings behind the illustrated split states and operational states are as follows, with the first term representing the split state and the second term representation the operational state:
   Idle/Ready: This is the initial and final state where the system 100 is operating in its normal hardware fault-tolerant mode 402.
   Prepare Split/Busy: This is a transient state entered when the administrator initiates the split processing. The service checks whether the system can be split and an online upgrade can be performed by forwarding a Prepare Split control request to each Split Subscriber.
   Prepare Split/Broken: This is a persistent state entered if any of the Split Subscribers failed to Prepare Split. The system 100 cannot enter split mode from this state. The next transition is Abort.
   Prepare Split/Ready: This is a persistent state entered when all Split Subscribers are prepared successfully. The service can enter hardware split mode 404. The next transition is either Execute Split or Abort.
   Split/Busy: This is a transient state entered when the service executes the split operations. It first enters hardware split mode 402 then forwards the Execute Split control request to each Split Subscriber.
   Split/Broken: This is a persistent state entered if hardware split mode failed or any Split Subscribers failed to execute split. The next transition is Abort.
   Split/Ready: This is a persistent state entered when all Split Subscribers have been successfully split (HW and SW). The actual software upgrade is done in this state on the secondary subsystem 104. Once the upgrade is completed, the administrator initiates the merge processing which results in the Prepare Merge transition. At any-time, the administrator can abort split mode which results in the Abort transition.

Prepare Merge/Busy: This is a transient state entered when the administrator initiates the merge processing. The services check whether the system can be merged by forwarding the Prepare Merge control request to each Split Subscriber.

Prepare Merge/Broken: This is a persistent state entered if any of the Split Subscribers failed to Prepare Merge. The next transition is Abort.

Prepare Merge/Ready: This is a persistent state entered when all Split Subscribers are prepared successfully. The service can leave hardware split mode in a manner that leaves the secondary subsystem 104 running. The next transitions are either Execute Merge, Abort or optionally Revert.

Merge/Busy: This is a transient state entered when the service executes the merge operations. It first leaves hardware split mode 404 in a manner that leaves the secondary subsystem 104 running then sends the Execute Merge control request to each Split Subscriber.

Merge/Broken: This is a persistent state entered if the hardware or any Split Subscribers report an error. The next transition is Abort.

Merge/Ready: This is a persistent state entered when all components have been merged successfully (HW and SW). At this point, the system is actively running applications against the updated system disk and the live data. However, the old system disk is still present and has not been destroyed or overwritten. At this point, the administrator is given one last chance to abort the update. The next transition is Abort or Commit.

Commit/Busy: This is a transient state entered when the administrator commits the merge. The services forward the Commit control request to each Split Subscriber. As this point, the old system data is preferably destroyed and re-mirrored from the updated system disk.

Commit/Broken: This state indicates that an unexpected failure has occurred. The Commit request can and should be retried until it succeeds.

Commit/Ready: This is a persistent state entered when all Split Subscribers are committed successfully. The next transition is Idle.

Abort/Busy: This is a transient state entered when the split process is aborted. The service informs all Split Subscribers that the system should be reverted to its original state. The abort state could be entered from the following states:

a) From the Prepare Split state in which case the original primary subsystem 102 is running in fault-tolerant mode so the service sends the Abort control request to each Split Subscriber.
  b) From the Split or Prepare Merge state in which case both subsystems are running in split mode so the service first leaves split mode in a manner that leaves the primary subsystem 102 running and reinitializes the secondary subsystem 104.
  c) From the Merge state in which case the secondary subsystem 104 is running in fault-tolerant mode so the service reboots the system 100 onto the old primary subsystem 102 then sends the Abort control request to each Split Subscriber.

Abort/Broken: This state indicates that an unexpected failure has occurred. The Abort request can and should be retried until it succeeds.

Abort/Ready: This is a persistent state entered when all Split Subscribers are aborted successfully. The next transition is Idle.

Idle/Busy: This is a transient state entered when the UI initiates the Idle transition. The publisher and subscriber must clean their state and release the necessary resources.

In the preferred embodiment, the subscribers and publishers are responsible to manage their split and operational state appropriately. Through the use of these states, an administrator can enter split mode 404, manage the split system, upgrade the secondary subsystem 104 and return to fully duplexed fault-tolerant operation 402 in a smooth and efficient manner.

Embodiments of the claimed invention have many advantages over the prior art. In particular, embodiments of the present invention provide systems and methods for rapidly splitting redundant, fault-tolerant computers and accessing, monitoring and upgrading those computers during the split. Advantageously, the claimed invention does not mandate the rebooting or initialization of the secondary subsystem 104 after the system is split. Accordingly, the secondary subsystem 104 will have an operational state identical to that of the primary subsystem 102 immediately after the split. In addition, as the split is effectuated through the flipping of a simple hardware bit or switch, the actual split occurs very quickly, and preferably, within a single clock cycle. Another advantage of the present system is that, while split, the secondary subsystem 104 can be accessed through the input devices connected to the overall computer system 100, and secondary keyboards, mice and displays are unnecessary. Due to the nature of the split, if an upgrade or modification to the secondary subsystem 104 is not satisfactory, the entire process can be aborted, and the system merged and resynchronized quickly and easily. Also, it is not necessary to modify any applications which run on this system for split-mode operation; the split is transparent to these applications. Finally, if the upgrade or modification to the secondary subsystem 104 is acceptable, then the system 100 can resume normal operation very quickly, and the primary subsystem 102 can be rapidly resynchronized, with a minimum amount of time spent off-line.

Variations, modification, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A method for splitting a fault-tolerant computer system comprising at least two processing subsystems executing in lockstep, wherein each processing subsystem executes identical instructions substantially simultaneously, the method comprising: designating an active subsystem and an upgrade subsystem from among the at least two processing subsystems, the active subsystem comprising a first processor and the upgrade subsystem comprising a second processor; isolating components within the upgrade subsystem from the other subsystems; splitting the fault-tolerant computer system after designating the active subsystem and the upgrade subsystem such that, at the time of the split, the first processor of the active subsystem and the second processor of the upgrade subsystem have identical operational states, but thereafter operate independently for the duration of a software upgrade and cease lockstep operation during the software upgrade; and after the software upgrade, resuming lockstep operation.

2. The method of claim 1, further comprising: performing a system check to ensure that the system can safely be split before the active subsystem and upgrade subsystem are designated.

3. The method of claim 2, wherein the system check comprises ensuring that all components in the computer system are in a fully-duplexed and safe-to-pull state.

4. The method of claim 1, further comprising: using the active subsystem to administer the installation of software on the upgrade subsystem.

5. The method of claim 4, further comprising: once the software has been installed on the upgrade subsystem, stopping any applications then executing on both the active subsystem and the upgrade subsystem.

6. The method of claim 5, further comprising: after the applications have been stopped, reconnecting the isolated components within the upgrade subsystem with the other subsystems.

7. The method of claim 6, further comprising: after the isolated components have been reconnected, merging the upgrade subsystem with the active subsystem.

8. The method of claim 7, further comprising: after the systems have been merged, resuming applications on the merged system.

9. The method of claim 8, further comprising: after applications have been resumed, synchronizing the merged system.

10. The method of claim 9, further comprising: after the computer system has been synchronized, restoring the computer to fault-tolerant operation using the newly installed software.

11. The method of claim 10, wherein the computer system is split, merged and restored to fault-tolerant operation without significant interruption in its ongoing operations.

12. The method of claim 11, wherein the computer system's ongoing operations are interrupted by less than one second during the split, merge and restore procedures.

13. The method of claim 4, wherein the software to be installed comprises new or updated operating system software.

14. The method of claim 4, further comprising: testing the software on the upgrade subsystem before applying similar changes to the active subsystem.

15. The method of claim 1, further comprising: using the active subsystem to access or administer the functions of the upgrade subsystem.

16. The method of claim 14, further comprising: installing firmware or making system configuration changes to the upgrade subsystem through the use of the active subsystem.

17. The method of claim 1, wherein isolating the components within the upgrade subsystem comprises isolating an upgrade subsystem network and an upgrade subsystem external storage from an active subsystem network and an active subsystem external storage.

18. The method of claim 17, further comprising removing the upgrade subsystem's access to all networks and external storage devices.

19. The method of claim 1, wherein splitting the computer system comprises implementing a hardware switch to split the system into the active subsystem and the upgrade subsystem.

20. The method of claim 8, further comprising: if, after applications have been resumed on the merged system, the software installation has not been performed successfully, rolling a state of the computer system back to a previously valid state.

21. The method of claim 9, further comprising: validating the upgrade before the merged system is synchronized.

22. A computer system comprising at least two processing subsystems operating in lockstep, wherein each processing subsystem executes identical instructions substantially simultaneously, configured to perform the following steps: designate a first subsystem and an second subsystem from among the at least two processing subsystems, the first subsystem comprising a first processor and the second subsystem comprising a second processor; isolate components within the second subsystem from the first subsystem; and split the system after designating the first subsystem as active subsystem and the second subsystem as upgrade subsystem such that, at the time of the split, the first processor of the first subsystem and the second processor of the second subsystem have identical operational states, but thereafter operate independently for the duration of a software upgrade and cease lockstep operation during the software upgrade.

23. The system of claim 22, further configured to perform a system check to ensure that the system can safely be split before the first subsystem and second subsystem are designated.

24. The system of claim 23, wherein the system check comprises ensuring that all components in the computer system are in a fully-duplexed and safe-to-pull state.

25. The system of claim 22, further configured to use the first subsystem to administer the installation of software on the second subsystem.

26. The system of claim 25, further configured to stop any applications then executing on both the first subsystem and the second subsystem, once the software has been installed on the second subsystem.

27. The system of claim 26, further configured to reconnect the isolated components within the second subsystem with the other subsystems, after the applications have been stopped.

28. The system of claim 27, further configured to merge the second subsystem with the first subsystem, after the isolated components have been reconnected.

29. The system of claim 28, further configured to resume applications on the merged system, after the systems have been merged.

30. The system of claim 29, further configured to synchronize the merged system, after applications have been resumed.

31. The system of claim 30, further configured to restore the computer system to fully-duplexed operation using the newly installed software, after the system has been synchronized.

32. The system of claim 25, wherein the software to be installed comprises new or updated operating system software.

33. The system of claim 22, wherein isolating the components within the second subsystem comprises removing the second subsystem's access to all networks and external storage devices.

34. The system of claim 22, wherein splitting the computer system comprises routing legacy I/O traffic on the second subsystem to the first subsystem using a hardware switch and initializing hardware registers to select primary and secondary subsystems when the split command is issued.

35. The system of claim 22, wherein the computer system comprises a dual-mode-redundant fault-tolerant system.

36. The system of claim 31, wherein the computer system's ongoing operations are interrupted by less than one second during the restore procedure.

37. A dual-mode redundant, fault-tolerant computer system comprising: a first subsystem comprising a first processor, a first network connection, and a first local mass storage medium; and a second subsystem comprising a second processor, a second network connection, and a second local mass storage medium, the second subsystem connected to and in lockstep operation with the first subsystem such that the first processor and second processor operate in lockstep, wherein each processing subsystem executes identical instructions substantially simultaneously; wherein, the second subsystem may be split from the first subsystem after designating the first subsystem as active subsystem and the second subsystem as upgrade subsystem, and operate independently for the duration of a software upgrade without rebooting or physically removing either subsystem and wherein lockstep operation of the first processor and second processor ceases during the software upgrade.

* * * * *